W. THURMAN.
CONVEYER.
APPLICATION FILED DEC. 31, 1910.
993,737.
Patented May 30, 1911.
2 SHEETS—SHEET 2.
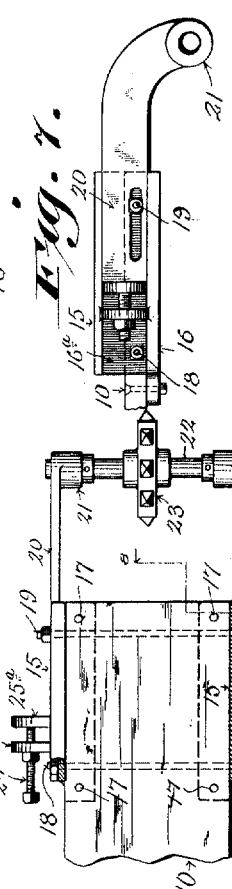
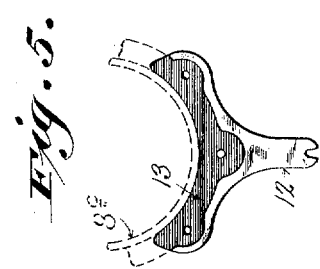
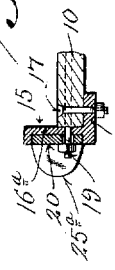
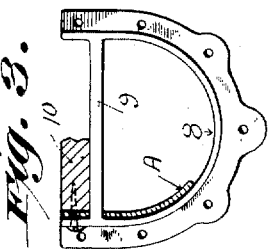
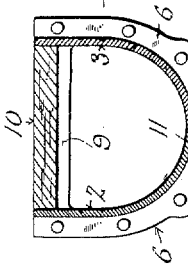
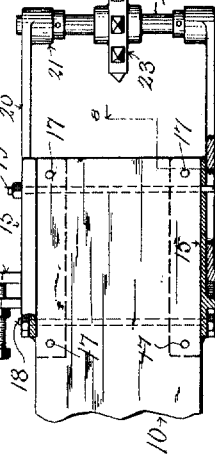
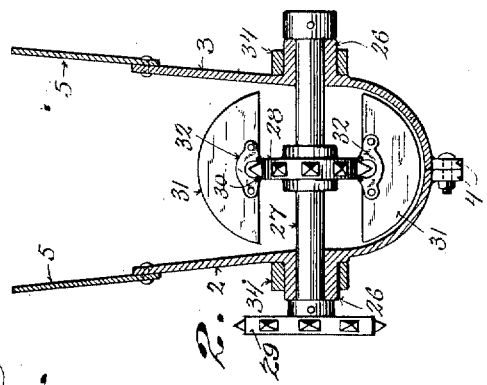
Witnesses:
Inventor:
William Thurman
By Oliphant & Young
Attorneys

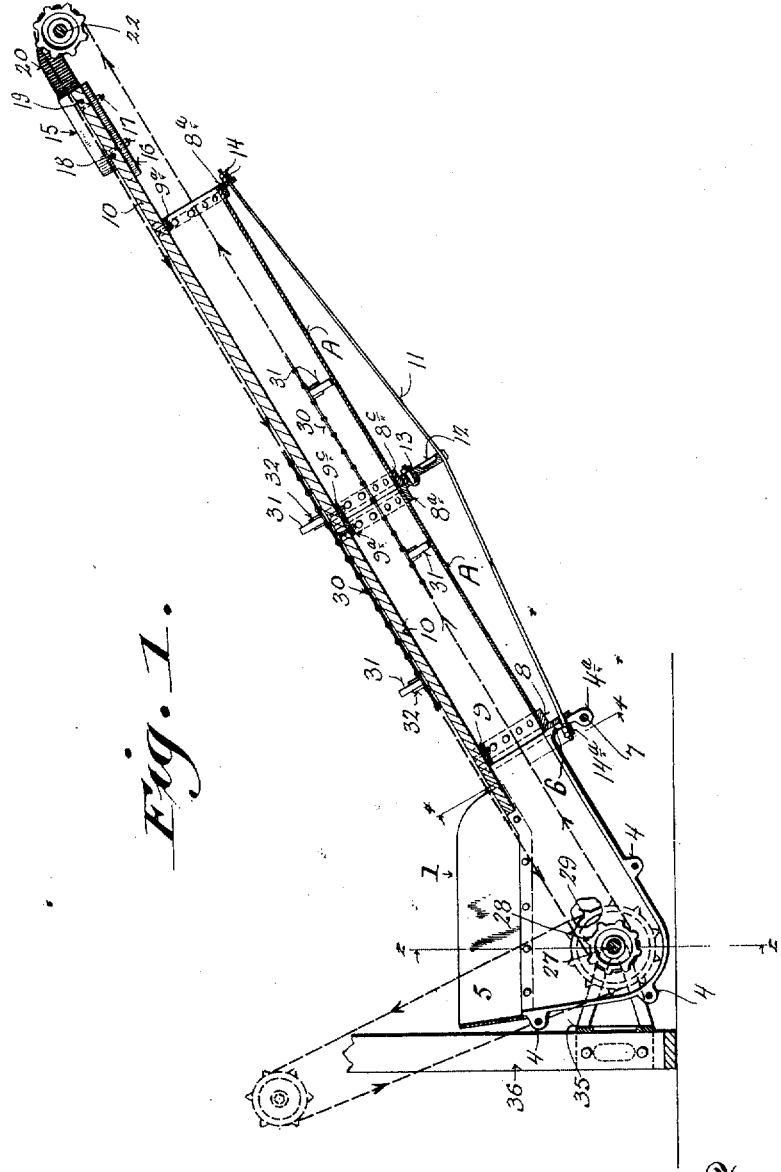

UNITED STATES PATENT OFFICE.

WILLIAM THURMAN, OF PLYMOUTH, WISCONSIN.

CONVEYER.

993,737.      Specification of Letters Patent.      Patented May 30, 1911.

Application filed December 31, 1910. Serial No. 600,341.

*To all whom it may concern:*

Be it known that I, WILLIAM THURMAN, a citizen of the United States, and resident of Plymouth, in the county of Sheboygan and State of Wisconsin, have invented certain new and useful Improvements in Conveyers; and I do hereby declare that the following is a full, clear, and exact description thereof.

My invention refers to endless conveyers primarily designed for use in connection with feed cutters, its general object being to provide simple, durable, economical and an effective device of this character having interchangeable parts so constructed and arranged as to permit the assemblage of a conveyer of any desired length, while at the same time longitudinal rigidity is maintained, the conveyer being capable of wide scope vertical adjustment about an axial support, whereby its vertical angle may be varied to accommodate the elevation of the receiver into which cut feed is discharged from the mouth of said conveyer.

Specific objects of my invention are to provide a yoke bracket, duplicates of which are adapted to transversely support the conveyer trough at its ends and intermediate parts and also a cover board therefor; to provide a vertically split two-part sectional hopper having transversely disposed flanges for connection with the face of the trough and longitudinally disposed matched lugs for securing the sections of the hopper together, the construction of which hopper cheapens the manufacture and renders the same capable of being readily assembled and when so assembled is capable of resisting the great strain to which it is subjected in the support of the conveyer trough; to provide a cover-board for the trough having an overhang that extends beyond the mouth of the trough to form a shield and also serve as a support for a shaft-hanger of the driving gear; to provide a simple and economical means for securing adjustable hangers for said shaft to the cover-board; to provide means in connection with the transversely disposed yoke brackets for attaching a longitudinal strut-brace, whereby the trough is stiffened throughout its length.

With the above objects in view my invention consists in certain peculiarities of construction and combination of parts as hereinafter set forth with reference to the accompanying drawings and subsequently claimed.

In the drawings Figure 1 represents a sectional elevation of a conveyer embodying the features of my invention, which conveyer is in hinged connection with brackets that are carried by a leg which may form part of a feed cutter or other apparatus from which material is discharged into the conveyer, the conveyer being shown as driven by chain-belt connection from a sprocket-wheel, as indicated in dotted lines; Fig. 2, a cross-section, as indicated by line 2—2 of Fig. 1, through the conveyer hopper; Fig. 3, a detail face view of a yoke bracket, a series of which are employed in the construction of the conveyer trough; Fig. 4, a cross-section of the hopper, as indicated by line 4—4 of Fig. 1; Fig. 5, a detail face view of a bridge-piece adapted to be fitted to the yoke bracket; Fig. 6, a detail plan view of the trough cover-board that projects beyond the discharge end of the trough, illustrating means for attaching adjustable shaft-hangers thereto; Fig. 7, a side elevation of one of the shaft-hangers shown in plan in Fig. 6; Fig. 8, a cross-section of the same, as indicated by line 8—8 of Fig. 6, and Fig. 9, a detail elevation of the conveyer supporting bracket.

Referring by characters to the drawings, 1 represents a longitudinally split two-part hopper, the sections 2, 3, of which are vertically divided and at their meeting edges formed with a series of matched lugs 4 that are bolted together as shown in Fig. 2. The side walls of the hopper are slightly flared and form an open mouth throughout its entire length, the bottom thereof being semi-circular in cross-section. Secured to the upper edge of the hopper side-walls is a sheet-metal band 5 that extends upward and around its mouth to form an extension shield for receiving the cut feed and guiding the same into said hopper. The outer end of each hopper section is provided with a transversely disposed right-angle flange 6, as shown in Fig. 4. Each flange at its bottom abutting face terminates with an apertured lug $4^a$, the pair being secured by a bolt 7, this pair of lugs, in conjunction with the lugs 4, serving to secure the sections of said hopper rigidly together. These flanges are similar in shape to a transversely disposed yoke-bracket 8 that is fitted thereto, the same being secured to the hopper-flanges by a series of rivets or bolts through matched apertures provided for this purpose in both the hopper flange and yoke-bracket. The yoke-bracket in cross-section is angular, its horizontal flange being adapted to receive the end of a semicircular trough A, which end matches the hopper end and is riveted or otherwise secured to the horizontal yoke-bracket flange. The upper ends of the yoke-bracket are connected by a bar 9 that serves as an end support for a cover-board 10, which cover-board is secured to the bar and also the horizontal flanges of the yoke-bracket, being flush with the ends thereof as shown. The discharge end of the trough A is also provided with a yoke-bracket $8^a$ similar to that before mentioned, the latter serving as a reinforce for the end of the trough to which it is secured, its bar $9^a$ serving as a support for the cover-board at this end, which cover-board is secured thereto in a similar manner to that described in connection with the first mentioned yoke-bracket.

In some instances, where it is desired to construct a trough of great length, the same may be built up from two or more sections, there being two of such sections shown in Fig. 1. The abutting intermediate ends of the sections are each provided with yoke-brackets $8^a$ and $8^c$ respectively similar in form to those previously described, the vertical flanges of which brackets abut each other and are riveted or otherwise secured together, the cross-bars $9^a$ and $9^c$ of each bracket serving as intermediate supports for the cover-board.

In order to add rigidity to the trough in a longitudinal direction, a truss-rod 11 is connected to the hopper and end yoke $8^a$ of said trough, the truss-rod being braced intermediate of its length by a bridge 12, which bridge is provided with a countersunk foot portion 13 that is adapted to register with the bottom portion of the yoke-bracket $8^c$, the same being secured thereto by bolts or rivets which pass through corresponding apertures in the vertical flange of the yoke-bracket and foot 13 of said bridge. Thus the oppositely disposed intermediate yokes and bridge are secured together by a single set of bolts or rivets. The vertical flanges of the end yoke-brackets 8 and $8^a$ are provided with centrally disposed apertures through which the ends of the truss-rods pass, the outer end of the truss-rod that engages yoke $8^a$ being secured thereto by nuts 14 in screw-threaded engagement therewith. The inner end of the truss-rod passes through the aperture in the bracket flange 8 and also through an aperture formed by semicircular recesses in the adjacent walls of the hopper flange 6 that registers with the aperture in said yoke-bracket. This end of the truss-rod is also threaded and provided with nuts $14^a$ that are in screw-threaded connection therewith. Thus the truss-rod is tautly adjusted and inclined in either direction from the bridge-piece 12, whereby rigidity is insured throughout the length of the trough, the strain being distributed at the discharge end of the trough through the yoke-bracket $8^a$ of the cover-board and through the hopper at the lower end of said trough.

As shown in Fig. 1, the cover-board projects considerably beyond the discharge mouth of the trough and its edges, adjacent to its end, have fitted thereto a pair of brackets 15. Bottom webs 16 of the brackets project under the cover-board and are secured thereto by means of bolts 17. Vertical webs $16^a$ of said brackets are secured to the cover-board by means of bolts 18, 19, which bolts pass through the webs of the brackets and cover-boards and are secured by suitable nuts that serve to clamp said brackets and board together transversely. The vertical webs $16^a$ of the brackets are flanged at their opposite edges and between these flanges are fitted arms 20 of a pair of shaft-hangers, the ends of which are provided with journals 21 for a shaft 22 that carries a sprocket-wheel 23. The arms are slotted longitudinally, through which slots the bolt 19 passes, the slots being arranged to provide adjustment of the hangers longitudinally, this adjustment being had by loosening the retaining nut or bolt 19, whereby said hangers may be moved outwardly by means of adjusting screws 24 that are in screw-threaded connection with ears 25 which extend from the brackets 15, the ends of the adjusting screws being adapted to engage ears $25^a$ that extend from the arms 20 of the hangers. By this arrangement it will be seen that said hangers when so adjusted are held against movement by the adjusting screws 24 and frictional engagement of the clamping bolt 19, which is tightened after movement of the hangers, the cover-board being further strengthened by means of said bolt and its corresponding bolt 18.

Journal-boxes 26 extend from the side-walls of the hopper for the reception of a drive-shaft 27, which drive-shaft carries a sprocket-wheel 28 that is centrally disposed with relation to the hopper, the shaft being extended through one of the journal-bearings for the reception of a driving sprocket-wheel 29. An endless chain-belt 30 is mounted upon the drive and driven sprocket-wheels 28 and 23, the said chain being provided with a series of lags 31, which lags are secured in any suitable manner to ears 32 of certain of the chain-links. The lags are formed with circular outer edges that conform to the circular bottom of the hopper and trough, their inner edges that rest upon the chain-links being straight to conform to the flat cover-board, over which the idle stretch of the chain-belt travels, while the working stretch thereof travels within the inclosed trough, it being understood that the cover-board terminates at a point adjacent to the outer end of the hopper, whereby its open mouth is free to receive cut feed or analogous material.

The journal-boxes 26 of the hopper are trunnioned in arms 34 of a one-piece bracket 35, which bracket, in turn is secured to legs 36 of a feed-cutter or other support to which the conveyer is attached, the sprocket-wheel 29 being in link-belt connection with a suitable source of power, which, in this instance, is indicated by dotted lines in Fig. 1.

In assembling the elevator it will be observed that the journal-boxes 26 of the two sections of the hopper are first inserted within the apertured arms 34 of the unitary bracket 35 and thereafter bolted together in the manner previously described. Hence, by this construction, great rigidity is obtained owing to the fact that the bracket 35, which supports the entire weight of the conveyer, is in one piece and thus strain upon the same will not cause the trunnions to be thrown out of alinement with respect to each other, which would be the case were the bracket made in two parts and separately connected to the legs 36.

From the foregoing description it is obvious that cut feed or other material dropped into the open mouth hopper will be caught by the lags and conveyed upwardly through the trough to its discharge, the idle stretch of the chain being supported by travel upon the cover-board.

In practice it has been found that the cut feed, when being discharged from the mouth of the trough, is liable to be thrown upwardly and thus choke the return stretch of the chain and, in order to overcome this tendency, the cover-board, as shown, extends beyond the mouth of the trough, as previously stated, for the purpose of forming a shield. By utilizing a hopper with an unobstructed passage to its bottom, the material delivered thereto is less liable to choke when engaged by the lags, it being understood that, while I have shown and described the conveyer with a chain and sprocket form of delivery, other forms of endless belt and pulley gear may be employed without departing from the spirit of my invention. The hangers and idle sprocket-wheel driving-shaft being arranged for adjustment for the purpose of taking up slack in the belt, which provision is usual in endless belt driven mechanisms.

From the foregoing description it will also be seen that by making provision for utilizing a single form of transversely disposed yoke-bracket that the trough may be constructed in indefinite lengths by employing duplicates of said yoke, which feature, in the manufacture of conveyers, materially decreases the cost of production. Furthermore, the cover-board and brackets being rigidly connected and in turn secured to the hopper, renders it possible to construct the circular trough sections of light material owing to the fact that there is practically no sagging strain placed upon the trough sections, the cover-board forming a backbone that is directly braced through the yokes by the truss-rod as described.

I claim:

1. A conveyer trough comprising a one-piece supporting bracket having apertured arms, a vertically divided two-piece conveyer hopper, securing means for the hopper pieces, matched flanges extending from the ends of the hopper pieces, a flanged bracket secured to the hopper flanges having a transversely disposed bar, a trough secured to the flanged bracket, a second flanged bracket secured to the mouth of the trough having a transversely disposed bar, a cover-board for the trough secured to the transverse bars of said brackets, the cover-board being extended beyond the mouth of the trough to form a shield, horizontal journal bearings extending from the hopper pieces trunnioned in the apertured bracket-arms, and a conveyer drive-shaft journaled within said hopper bearings.

2. In a conveyer having a trough, supporting brackets for the trough having cross-bars, and a cover-board secured to the bracket cross-bars; the combination of brackets having vertical and horizontal webs fitted to the outer end of the cover-board, securing bolts for the web brackets arranged to pass endwise through the cover-board, ribs projecting from the edges of the vertical webs of the jackets, slotted hanger arms fitted between the webs, through which slots one of the bracket bolts are adapted to pass, means in connection with the brackets for adjusting the hangers, and a conveyer shaft mounted in said hangers.

3. A conveyer trough comprising a hopper section having vertical flanges disposed about its mouth, a flanged bracket secured to the hopper flanges having a transverse bar, a trough secured to the bracket, similar brackets having transverse bars secured at the end and an intermediate point of the trough, a detachable bridge secured to the intermediate bracket, a truss-rod secured to the hopper flange mouth and end bracket of the trough, the truss-rod being engaged by the bridge, and a cover-board secured to the cross-bars of the brackets, the cover-board and truss-rod in connection with the brackets forming a rigid skeleton support for said trough.

In testimony that I claim the foregoing I have hereunto set my hand at Plymouth, in the county of Sheboygan and State of Wisconsin in the presence of two witnesses.

WILLIAM THURMAN.

Witnesses:
H. W. Hostman,
W. L. Kuestner.

Copies of this patent may be obtained for five cents each, by addressing the "Commissioner of Patents, Washington, D. C."